United States Patent [19]

Zerpner et al.

[11] 4,412,038
[45] Oct. 25, 1983

[54] LOW MOLECULAR WEIGHT 1,3-BUTADIENE POLYMERS CONTAINING REACTIVE SILYL GROUPS, WHICH ARE STABILIZED AGAINST CROSSLINKING

[75] Inventors: Dieter Zerpner; Roland Streck, both of Marl, Fed. Rep. of Germany

[73] Assignee: Chemische Werke Huels AG, Marl, Fed. Rep. of Germany

[21] Appl. No.: 405,010

[22] Filed: Aug. 4, 1982

[30] Foreign Application Priority Data

Aug. 5, 1981 [DE] Fed. Rep. of Germany ....... 3130928

[51] Int. Cl.³ .............................................. C08F 8/00
[52] U.S. Cl. .................................. 525/101; 525/105; 525/476; 556/435
[58] Field of Search ............... 556/435; 525/101, 105, 525/476

[56] References Cited

U.S. PATENT DOCUMENTS

| | | | |
|---|---|---|---|
| 3,624,014 | 11/1971 | Moore et al. | 525/105 |
| 3,857,825 | 12/1974 | Streck et al. | 526/128 |
| 3,920,714 | 11/1975 | Streck | 526/142 |
| 3,920,715 | 11/1975 | Streck et al. | 526/128 |
| 3,929,850 | 12/1975 | Streck et al. | 526/128 |
| 4,183,844 | 1/1980 | Streck et al. | 526/263 |
| 4,369,279 | 1/1983 | Emerick | 525/101 |

FOREIGN PATENT DOCUMENTS 2437093 2/1976 Fed. Rep. of Germany .

Primary Examiner—Melvyn I. Marquis
Attorney, Agent, or Firm—Millen & White

[57] ABSTRACT

Silyl-group-containing 1,3-butadiene polymers are stabilized against self crosslinking by addition of epoxides having an epoxy oxygen content of 2–17% by weight.

5 Claims, No Drawings

LOW MOLECULAR WEIGHT 1,3-BUTADIENE POLYMERS CONTAINING REACTIVE SILYL GROUPS, WHICH ARE STABILIZED AGAINST CROSSLINKING

BACKGROUND OF THE INVENTION

In the past, Si-containing polybutadienes (called Si-polyoils hereinbelow) have gained increasing significance as adhesion promoters (tackifiers) in mixtures of elastomer and mineral fillers see DAS 2,635,601 and U.S. Pat. No. 4,183,844, the latter's disclosure being entirely incorporated by reference herein. These contain, in addition to an unsaturated polymer chain, solely reactive silyl groups of the formula —SiXYZ, wherein X is a hydrolyzable alkoxy group of 1-6 carbon atoms, preferably a methoxy or ethoxy group, while Y and Z, independently of each other, either are the same as X or are hydrogen, alkyl of 1-8 carbon atoms, cycloalkyl of 5-12 carbon atoms, or optionally substituted phenyl of 6-12 carbon atoms. Si-polyoils usually have an average molecular weight of 400-4,000.

The starting materials used in the production of such Si-polyoils are frequently chlorine-containing silanes. The resultant products then contain chlorosilyl groups, which can conventionally be converted into alkoxysilyl groups, for example by reaction with alcohols or trialkyl orthoformates. The most important processes for the preparation of Si-polyoils are briefly sketched below:

1. Silanes containing at least one Si-H-bond can be chemically added to polybutadiene oils. For example, trichlorosilane is used as the starting compound according to the process of DAS No. 2,314,543 = U.S. Pat. No. 3,920,714, the latter's disclosure being entirely incorporated by reference herein.

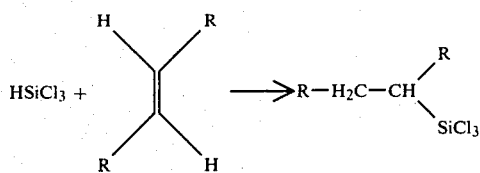

2. By a Diels-Alder reaction, according to the process of DOS 3,003,893, corresponding to U.S. application Ser. No. 230,483 of Feb. 29, 1981, the latter's disclosures being entirely incorporated by reference herein, Si-polyoils which contain cyclohexyl rings can be produced from polybutadienes containing conjugated double bonds and from silanes containing vinyl residues, such as, for example, vinyltrichlorosilane.

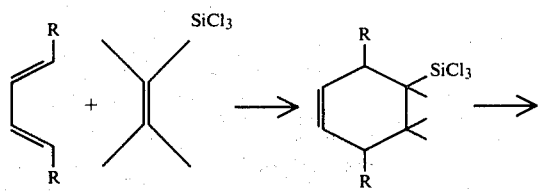

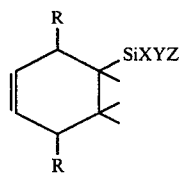

3. Polybutadienes not containing a conjugated double bond react along the lines of an "ene" reaction with vinyltrichlorosilane.

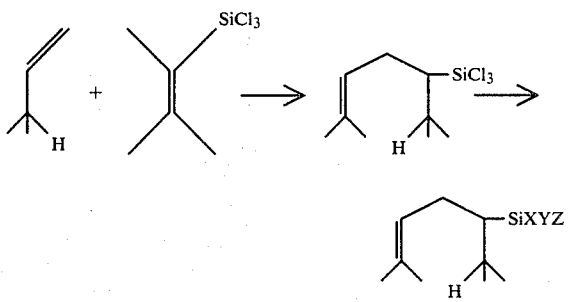

See also DOS's 3022989 and 3028839, corresponding to U.S. application Ser. No. 273,289 of June 15, 1981, the latter's disclosure being entirely incorporated by reference herein.

Also see commonly assigned, U.S. applications Ser. Nos. 396,217 and 396,218, both filed on July 8, 1982, whose disclosures are incorporated by reference herein.

4. Finally, use of metathesis opens up two further possibilities for forming Si-polyoils. A polymerization can be conducted according to the method of German Patent 2,157,405 = U.S. Pat. Nos. 3,857,825; 3,920,715 and 3,929,850, the disclosures of the latter three U.S. patents being entirely incorporated by reference herein, using cycloolefins, such as, for example 1,5-cyclooctadiene or 1,5,9-cyclododecatriene, in conjunction with Si-containing, open-chain olefins acting as regulators:

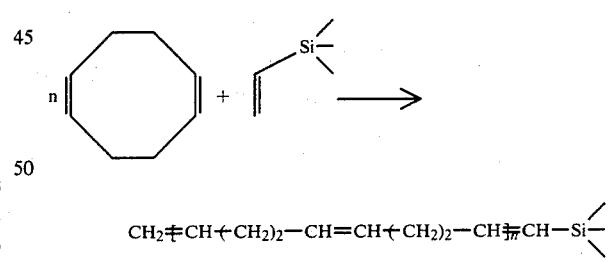

$$CH_2\!=\!CH\!\left(CH_2\right)_2\!-\!CH\!=\!CH\!\left(CH_2\right)_2\!-\!CH\!=\!CH\!-\!Si\!\diagup\diagdown$$

or a copolymerization can be conducted according to DAS 2,314,543 = U.S. Pat. No. 3,920,714, the latter's disclosures being entirely incorporated by reference herein, using cycloolefins in conjunction with other cycloolefins having a reactive silyl group.

The effect of the Si-polyoils as adhesion promoters between mineral substances, on the one hand, and elastomers, on the other hand, seems to be due to the fact that the Si residue enters into an interaction with the mineral components, while the olefinic portion can be conventionally crosslinked with the elastomer by means of sulfur or peroxides. A broader range of application of the Si-polyoils has not been achievable heretofore on account of their poor preservability, especially in the presence of traces of water. If Si-polyoils are exposed to atmospheric humidity during storage, superficial gelling occurs after only a short period of time, with subsequent pellicle formation due to intermolecular cross-linking. It is presumed that the number of reactive alkoxysilyl groups decreases in correspondence with the equation

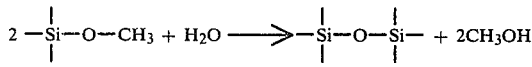

With progressing reaction, insoluble components are formed which are no longer uniformly distributed in an elastomer mixture. The usefulness of the Si-polyols as adhesion promoters is thus considerably restricted.

In polymeric, silyl-group-containing haloalkanes prepared from vinyl chloride and vinyltrialkoxysilane, troublesome gelling occurs even during copolymerization. It is known from DOS 2,437,093, that in such cases, the shelf stability can be increased by adding certain epoxides to the reaction charge prior to or under certain circumstances, also during reaction. Incorporation of these epoxides, however, effected after cessation of reaction cannot prevent the aforedescribed, interfering gelling phenomena. The process of DOS 2,437,093 thus remains unsatisfactory under practical conditions.

SUMMARY OF THE INVENTION

It is, accordingly, an object of this invention to provide Si-polyoils which are shelf-stable, as well as stabilized with respect to atmospheric humidity, and to provide a method for the production of these Si-polyoils.

Upon further study of the specification and appended claims, further objects and advantages of this invention will become apparent to those skilled in the art.

These objects have been attained in view of the finding that addition of 0.01-20%, preferably 0,3-5,0% by weight, of an epoxy compound containing, 2-17% by weight, preferably 4-10% by weight, of epoxy oxygen to Si-polyoils considerably prolongs their shelf stability in moist air.

Thus, the invention relates to 1,3-butadiene polymers (i.e., homo- and the usual copolymers) having an average molecular weight ($\overline{Mn}$) of 400-4,000 and carrying silyl groups of the formula —SiXYZ wherein X is a hydrolyzable alkoxy group of 1-6 carbon atoms, while Y and Z, independently are one of the X groups, e.g., the same as X; or can be hydrogen, alkyl of 1-8 carbon atoms, cycloalkyl of 5-12 carbon atoms, or optionally substituted phenyl of 6-12 carbon atoms, (e.g., substituted by halogen (e.g., Cl or Br) and/or alkyl) and which contain e.g., are combined with 0.01-20% by weight of an epoxy compound having an epoxy oxygen content of 2-17% by weight.

DETAILED DISCUSSION

Suitable epoxides for use in this invention are compounds having at least one epoxy group per molecule and containing between 2 and 17% by weight of epoxy oxygen. The latter is the sole critical feature. The epoxy compounds can contain double bonds, as well as phenyl groups; they can also have oxygen and/or silicon as hetero atoms; and, finally, they can be of low as well as of high molecular weights (e.g., $\overline{Mn}$'s of 98-4000). Examples include:
1. Epoxides of cycoalkanes, (e.g. with a ring size of 5 to 12 C-atoms and a maximum molecular weight of 300) such as, for example, 1,2,5,6-bisepoxy-9-cyclododecane; (Houben/Weyl, Band VI 13, p. 367 ff., Stuttgart 1965).
2. Ethers of aromatic alcohols, (e.g., of 8-100 C-atoms), usually based on hydrocarbon aromatics, such as, for example, the bisglycidyl ether of bisphenol A; or
3. Si-Containing compounds, such as, for example, 3.4-epoxycyclohexylethyltrimethoxysilane or 3-glycidyloxypropyltrimethoxysilane.

However, the epoxides of polybutadienes of molecular weight 400-4,000 are preferred according to this invention. (W. Dittmann and K. Hamann, Chemiker-Zeitung 95, 684 (1971).

The precise amount of epoxide added depends on the polyoil utilized. The optimum quantity can be readily determined by routine experiments.

The epoxides are suitably added to the freshly prepared Si-polyoils. However, it is, of course, also possible to add the epoxy compounds at a later point in time. It must be realized, however, that the effects of the aforedescribed gelling which is to be prevented by this invention cannot be reversed to the extent that delay has permitted it to commence. Even after it has commenced, it can still definitely be arrested by this invention.

Independently of the humidity stabilization above, the Si-polyols can be further stabilized against air oxidation by means of known prior-art methods. (Kautschuk-Handbuch, Band 4, p. 372 ff., Hrsg. S. Boström, Stuttgart, 1961).

Details of the Si-polyoils are fully conventional and are as described in the references disclosed above, all of which are incorporated by reference herein as are all other references cited herein. It should be stated, that the process according to DOS 24 37 093 is purposely related to the stabilization of the copolymerization of vinyl chloride and vinyltrialkoxysilane in the presence of radical-forming catalysts. A subsequent addition of the epoxy compound to the product is described as being uneffective. Therefore the process, disclosed in the DOS 24 37 093 is not applicable to the stabilization of Si-polyoils.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1a (This Invention)

10 g of a Si-polyoil (Si content 2.5% by weight, $\overline{Mn}$=2,300, double bond distribution: 15% trans, 36% vinyl, 49% cis), prepared according to the process of DAS 2,635,601 U.S. Pat. No. 4,183,844), was mixed in a crystallizing dish (diameter 4.5 cm) with 0.5% by weight of the epoxide of a polybutadiene oil ($\overline{Mn}$=1,470; 13% trans, 46% vinyl, 41% cis) with an epoxy content of 6.2% by weight, and stored in a desiccator (diameter 30 cm) at 25° C. over a crystallizing dish with 400 g of water. After 3 months, there were no signs of crosslinking observed.

EXAMPLE 1b (Comparative Example)

10 g of the same Si-polyoil used in Example 1a, but without adding the epoxy compound, started to gel on the surface, under the same conditions, after about 24 hours. A crosslinked skin was gradually formed. After 3 days, the specimen was covered by a firm gel layer.

EXAMPLE 2a

The viscosity of a sample of 100 g of the Si-polyoil and epoxide corresponding to Example 1a was measured with a high-pressure capillary rheometer. For this purpose, the stirred specimen was maintained for 96 hours in a sealed vessel adjusted to a temperature of 60° C., and the viscosity was determined at chronological intervals.

EXAMPLE 2b

Correspondingly, the viscosity was determined of a mixture of 100 g of the Si-polyoil corresponding to Example 1a and 0.5% by weight of the epoxide of a polybutadiene oil ($\overline{M}n = 1,900$; 26% trans, 1% vinyl, 73% cis), having an epoxy content of 3.6%.

EXAMPLE 2c

In a comparative example, the viscosity of 100 g of the Si-polyoil corresponding to Example 1a was determined but without addition of an epoxy compound.

TABLE 1

Viscosities of Si-Polyoils With and Without Addition of Epoxy Compounds in Poises (1 p = 1 dPa s) After x Hours

| Example | 0 | 8 | 24 | 48 | 96 (Hrs.) |
|---|---|---|---|---|---|
| 2a | 1.52 | 1.49 | 1.62 | 1.86 | 2.09 |
| 2b | 1.51 | 1.54 | 1.59 | 1.78 | 2.04 |
| 2c | 1.64 | 1.91 | 2.38 | — | — |

EXAMPLE 3

The Si-polyoils listed in Table 2 were mixed analogously to Example 1a with the indicated amounts of various epoxy compounds. In all specimens stabilized by epoxide addition, no crosslinked pellicle had formed even after 3 months, whereas the unstabilized specimens were covered with a gelled layer as early as after 3 days, and were completely gelled throughout after one month.

TABLE 2

Si—Polyoil-Epoxide Mixtures Used

| Si—Polyoil | $\overline{M}n$ | Si % | Double Bond Distribution trans/vinyl/cis | Amount % | Compound | Epoxide Content % |
|---|---|---|---|---|---|---|
| A | 680 | 2.0 | 7/60/33 | 0.1 | Epoxide of Ex. 1a | 6.2 |
| B | 940 | 2.9 | 12/44/44 | 5.0 | Bisglycidyl Ether of Bisphenol A | 9.4 |
| B | 940 | 2.9 | 12/44/44 | 0.08 | Epoxide of Ex. 1a | 6.2 |
| C | 1,200 | 2.7 | 13/41/46 | 10 | Epoxide of Ex. 1a | 6.2 |
| C | 1,200 | 2.7 | 13/41/46 | 10 | 1,2,5,6-Bisepoxy-9-cyclododecene | 16.5 |
| C | 1,200 | 2.7 | 13/41/46 | 0.125 | Epoxide of Ex. 1a | 6.2 |
| D | 2,300 | 2.5 | 15/36/49 | 0.5 | Epoxide of Ex. 2b | 3.6 |
| D | 2,300 | 2.5 | 15/36/49 | 0.5 | 3-Glycidyloxypropyl-trimethoxysilane | 6.8 |
| E | 3,900 | 2.6 | 7/55/38 | 20 | Epoxide of Ex. 1a | 6.2 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can made various changes and modifications of the invention to adapt it to various usages and conditions.

What is claimed is:

1. In a 1,3-butadiene polymer having an average molecular weight ($\overline{M}n$) of 400–4,000 and having bound silyl groups of the formula —SiXYZ wherein X is alkoxy of 1–6 carbon atoms, and Y and Z independently are an X group, hydrogen, alkyl of 1–8 carbon atoms, cycloalkyl 5–12 carbon atoms, phenyl, or phenyl substituted of halogen or alkyl of 6–12 total carbon atoms, the improvement wherein there is combined therewith 0.01–20% by weight of the total combination of an epoxy compound having an epoxy oxygen content of 2–17% by weight.

2. A polymer of claim 1, wherein the epoxy compound is an epoxide of polybutadiene having an average molecular weight (Mn) of 400–4,000.

3. A polymer of claim 1 or 2 wherein the epoxy compound is combined with the 1,3-butadiene polymer by addition thereto after the latter has separately been prepared.

4. A polymer of claim 3 wherein the epoxy compound is 1,2,5,6-bisepoxy-9-cyclododecene; bisglycidyl ether of bisphenol A; 3,4-epoxycyclohexylethyltrimethoxysilane or 3-glycidyloxypropyltrimethoxysilane.

5. A method for increasing the shelf stability against gelling of a 1-3-butadiene polymer having an average molecular weight ($\overline{M}n$) of 400–4,000 and having bound silyl groups of the formula —SiXYZ wherein X is alkoxy of 1–6 carbon atoms, and Y and Z independently are an X group, hydrogen, alkyl of 1–8 carbon atoms, cycloalkyl 5–12 carbon atoms, phenyl or phenyl substituted by halogen or alkyl of 6–12 total carbon atoms, comprising combining therewith 0.01–20% by weight of the total combination of an epoxy compound having an epoxy oxygen content of 2–17% by weight.

* * * * *